(12) United States Patent
Son et al.

(10) Patent No.: US 11,482,763 B2
(45) Date of Patent: Oct. 25, 2022

(54) DEVICE FOR CHARGING AND DISCHARGING SECONDARY BATTERY

(71) Applicant: LG CHEM, LTD., Seoul (KR)

(72) Inventors: Jae-Hyoung Son, Daejeon (KR); Chang-Bum Ahn, Daejeon (KR); Ik-Soo Chae, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 223 days.

(21) Appl. No.: 16/958,626

(22) PCT Filed: May 29, 2019

(86) PCT No.: PCT/KR2019/006430
§ 371 (c)(1),
(2) Date: Jun. 26, 2020

(87) PCT Pub. No.: WO2020/032362
PCT Pub. Date: Feb. 13, 2020

(65) Prior Publication Data
US 2020/0365868 A1    Nov. 19, 2020

(30) Foreign Application Priority Data

Aug. 9, 2018 (KR) .................. 10-2018-0093226

(51) Int. Cl.
*H01M 10/44* (2006.01)
*H01M 50/54* (2021.01)
(Continued)

(52) U.S. Cl.
CPC ....... *H01M 50/54* (2021.01); *H01M 10/0585* (2013.01); *H01M 10/44* (2013.01); *H01M 50/543* (2021.01)

(58) Field of Classification Search
CPC ......... H01M 10/0404; H01M 10/0481; H01M 10/0585; H01M 10/44; H01M 10/446;
(Continued)

(56) References Cited

U.S. PATENT DOCUMENTS

2011/0318623 A1    12/2011    Lee et al.
2016/0079635 A1    3/2016    Niwa
2017/0133705 A1    5/2017    Niwa et al.

FOREIGN PATENT DOCUMENTS

CN         195826985 A    8/2016
CN         207009564 U    2/2018
(Continued)

OTHER PUBLICATIONS

Extended European Search Report for European Application No. 19848654.0, dated Apr. 29, 2021.
(Continued)

*Primary Examiner* — Victoria H Lynch
(74) *Attorney, Agent, or Firm* — Birch, Stewart, Kolasch & Birch, LLP

(57) ABSTRACT

A secondary battery charging and discharging apparatus for performing a secondary battery activation process including a plurality of compression plates disposed to face each other to form a cell insert space therebetween in which a secondary battery cell is disposed, the plurality of compression plates moving to reduce a gap therebetween to press a body of the secondary battery cell; gripper units respectively mounted to the compression plates to move integrally with
(Continued)

the compression plates, the gripper units coming into contact with an electrode lead of the secondary battery cell when the compression plate presses the body of the secondary battery cell; and push bar units respectively mounted to the compression plates to be adjacent to the gripper units and configured to press a terrace portion of the secondary battery cell adjacent to the electrode lead is provided.

16 Claims, 13 Drawing Sheets

(51) Int. Cl.
  *H01M 10/0585* (2010.01)
  *H01M 50/543* (2021.01)
(58) Field of Classification Search
  CPC .. H01M 50/211; H01M 50/54; H01M 50/543; H02J 7/0045; H02J 7/0069; Y02E 60/10; Y02P 70/50
  See application file for complete search history.

(56) References Cited

FOREIGN PATENT DOCUMENTS

| | | |
|---|---|---|
| CN | 207269044 U | 4/2018 |
| JP | 2005-197179 A | 7/2005 |
| JP | 3735585 B2 | 1/2006 |
| KR | 10-2010-0047907 A | 5/2010 |
| KR | 20-0457509 Y1 | 12/2011 |
| KR | 10-1482042 B1 | 1/2015 |
| KR | 10-2016-0004661 A | 1/2016 |
| KR | 10-2016-0106917 A | 9/2016 |
| KR | 10-2016-0129031 A | 11/2016 |
| KR | 10-1714951 B1 | 3/2017 |
| KR | 10-2017-0061622 A | 6/2017 |
| KR | 10-2017-0068145 A | 6/2017 |
| KR | 10-1793162 B1 | 11/2017 |
| KR | 10-2018-0025805 A | 3/2018 |
| KR | 10-2018-0038181 A | 4/2018 |

OTHER PUBLICATIONS

International Search Report for PCT/KR2019/006430 (PCT/ISA/210) dated Sep. 24, 2019.

DEVICE FOR CHARGING AND DISCHARGING SECONDARY BATTERY

TECHNICAL FIELD

The present disclosure relates to a secondary battery charging and discharging apparatus, and more particularly, to a secondary battery charging and discharging apparatus capable of significantly reducing a product failure rate caused by a swelling phenomenon at a terrace portion of a secondary battery cell in a secondary battery activation process.

The present application claims priority to Korean Patent Application No. 10-2018-0093226 filed on Aug. 9, 2018 in the Republic of Korea, the disclosures of which are incorporated herein by reference.

BACKGROUND ART

Generally, secondary batteries may be classified into cylindrical, rectangular and pouch-type secondary batteries depending on their shapes. Among them, the pouch-type secondary battery configures its appearance by using a metal layer (foil) and a pouch exterior made of a multilayer film having synthetic resin layers coated on an upper surface and a lower surface of the metal layer, so the weight of the battery may be significantly reduced compared to the cylindrical or rectangular secondary batteries. Thus, it is possible to reduce the weight of the battery and to be changed into various shapes.

In the pouch-type secondary battery, an electrode assembly is accommodated in a stacked form. An electrode tab and an electrode lead are connected to the electrode assembly, and the electrode lead protrudes from the pouch exterior. These electrode lead is electrically connected by contact with an external device to receive power from the external device.

The pouch-type secondary battery is manufactured by assembling cells and activating a battery. In the battery activation step, a secondary battery cell is mounted in a charging and discharging apparatus, and charging and discharging are performed under conditions necessary for activation. The process of performing predetermined charging and discharging using the charging and discharging apparatus to activate the battery is called a formation process.

In order to perform the formation process of the secondary battery, the secondary battery should be properly mounted to the charging and discharging apparatus. That is, the electrode lead of the secondary battery should be disposed to be in contact with a conductive portion of the charging and discharging apparatus so that the electrode lead is electrically connected to the conductive portion, and the electrical connection state must be maintained during charging and discharging.

To this end, the charging and discharging apparatus of the secondary battery generally includes a plurality of compression plates for fixing the secondary battery cells. The pouch-type secondary battery is inserted between two compression plates, and while applying a pressure from both sides, a current is applied through the leads of the secondary battery to perform charging.

Since the secondary battery cell is pressed using the compression plates as above, it is possible to suppress the increase in thickness of the secondary battery cell due to gas generation in the charging and discharging process. At this time, the generated gas is collected in a gas pocket and removed after the activation process. The gas pocket is a portion of the pouch exterior that extends in the direction intersecting the electrode lead from a cell body portion that is pressurized in the activation process. The gas pocket may be cut off later from the pouch exterior.

Meanwhile, when the formation process is performed using the conventional charging and discharging apparatus, a body portion of the secondary battery cell forming the thickness of the secondary battery cell may be pressed by the compression plate in the charging and discharging process. However, a cell terrace portion serving as a sealing portion of the pouch exterior is not pressed by the compression plate since it has a step with the cell body portion.

Accordingly, the inner pressure of the pouch exterior is increased due to the gas generated in the charging and discharging process, which breaks the bonding layer of the terrace portion of the secondary battery cell.

That is, the pouch exterior may include an outer insulation layer and an inner bonding layer of a polymer material, and a metal layer interposed between the outer insulation layer and the inner bonding layer. Here, as shown in FIG. 1, the inner bonding layer in the cell terrace 2$b$ may be broken to cause the swelling phenomenon. Due to the swelling phenomenon, the metal layer of the cell terrace 2$b$ portion is exposed to cause an insulation voltage fault. Since the insulation voltage fault may cause serious problems in the operation of the secondary battery cell, there is an urgent need to find a way for reducing the swelling phenomenon at the cell terrace 2$b$.

DISCLOSURE

Technical Problem

The present disclosure is designed to solve the problems of the related art, and therefore the present disclosure is directed to providing a secondary battery charging and discharging apparatus, which may improve an insulation voltage failure rate by suppressing a swelling phenomenon at a terrace portion of a secondary battery cell in a charging and discharging process.

However, the technical problem to be solved by the present disclosure is not limited to the above-described problem, and other problems not mentioned herein will be clearly understood by those skilled in the art from the following description.

Technical Solution

In one aspect of the present disclosure, there is provided a secondary battery charging and discharging apparatus for performing a secondary battery activation process, comprising: a plurality of compression plates disposed to face each other to form a cell insert space therebetween in which a secondary battery cell is insertable, the plurality of compression plates being movable toward each other to reduce a gap therebetween to press a body of the secondary battery cell inserted into the cell insert space; at least one gripper unit mounted to each compression plate of the plurality of compression plates to move integrally with each compression plate, the at least one gripper unit coming into contact with an electrode lead of the secondary battery cell when adjacent compression plates press the body of the secondary battery cell; and at least one push bar unit mounted to each compression plate to be adjacent to the at least one gripper unit and configured to press a terrace portion of the secondary battery cell adjacent to the electrode lead.

Each push bar unit may include a push bar head portion connected to the gripper unit and placed on the compression plate; and a push bar pressing portion extending from the push bar head portion to the cell insert space.

The push bar pressing portion may be disposed to overlap with at least one of a front surface or a rear surface of the compression plate.

The push bar pressing portion may have a rod shape corresponding to a width and a length of the terrace portion of the secondary battery cell.

The push bar head portion may include an upper part having a surface inclined or curved toward the cell insert space and a lower part formed having a width greater than a thickness of the compression plate.

A bolt penetration hole may be formed in each of the upper part of the push bar head portion and a portion of the gripper unit facing the upper part such that a bolt is insertable into the bolt penetration holes.

Each gripper unit may include a gripper head portion placed on the compression plate; and a gripper pressing portion extending from the gripper head portion to the cell insert space.

The gripper pressing portion may be disposed to overlap with at least one of a front surface or a rear surface of the compression plate.

The gripper pressing portion may include: a first gripper pressing portion disposed to be in contact with the front surface of the compression plate, the first gripper pressing plate being an elastically deformable plate assembly; and a second gripper pressing portion disposed to be in contact with the rear surface of compression plate, the second gripper pressing plate being a flat plate.

The first gripper pressing portion includes: a current terminal configure to contact the electrode lead to apply a current to the electrode lead, the current terminal being a metal rod; and a voltage terminal configured to detect a voltage of the secondary battery.

The current terminal and the voltage terminal may each have a notch formed in a lattice pattern.

The gripper head portion may include a cap member located on the gripper pressing portion, the cap member having a surface inclined or curved toward the cell insert space.

The gripper head portion may be configured to be slidable along a top end of the compression plate while supporting the gripper pressing portion.

The at least one gripper unit may include two gripper units for each compression plate, the two gripper units may be located at opposite ends of each compression plate in a longitudinal direction of each compression plate, and the at least one push bar unit may include two push bar units for each compression plate, the two push bar units may be located at the opposite ends of each compression plate.

The secondary battery charging and discharging apparatus may further comprise a plurality of cell entry guides located at a top end of each compression plate to guide the secondary battery cell into the cell insert space, and the plurality of cell entry guides may protrude by a predetermined height from the top end of the compression plate, each cell entry guide may have a surface inclined or curved toward the cell insert space.

Advantageous Effects

According to an embodiment of the present disclosure, it is possible to provide a secondary battery charging and discharging apparatus, which may improve an insulation voltage failure rate by suppressing a swelling phenomenon at a terrace portion of a secondary battery cell in a charging and discharging process.

According to another embodiment of the present disclosure, it is possible to charge and discharge secondary battery cells having different sizes by adjusting the locations of the gripper unit and the push bar unit, thereby ensuring high device compatibility.

According to still another embodiment of the present disclosure, since the secondary battery cells are guided by the cell entry guide when being mounted to the charging and discharging apparatus, the secondary battery cells may be mounted to accurate locations efficiently.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

A secondary battery charging and discharging apparatus according to the present disclosure described below refers to a device for activating a secondary battery cell by charging and discharging the secondary battery cell that is not activated after being completely assembled. The secondary battery charging and discharging apparatus is not only mainly used for activating the secondary battery cell, but also may be used to test the performance of the secondary battery cell, for example to check whether the cell is shorted.

Figure 1:
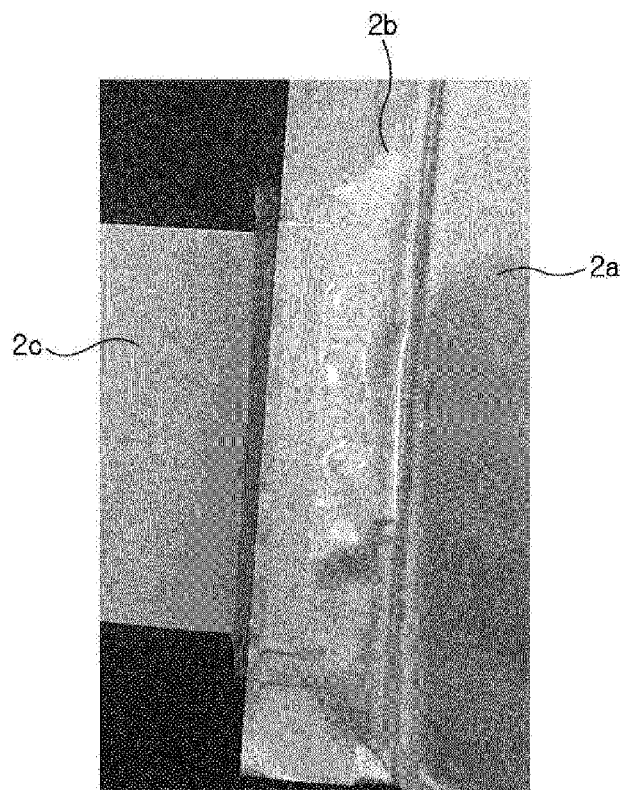
FIG. 1 is a diagram showing a terrace portion of a conventional pouch-type secondary battery cell to which the formation process has been performed.
Figure 2:
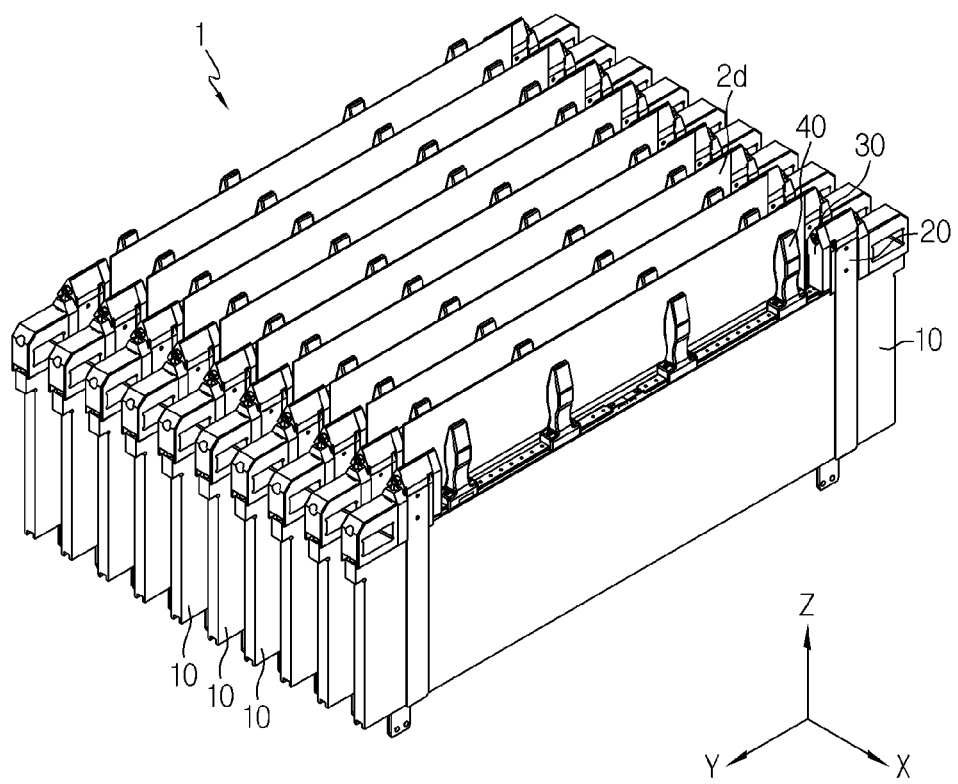
FIG. 2 is a perspective view schematically showing a charging and discharging apparatus according to an embodiment of the present disclosure.
Figure 3:
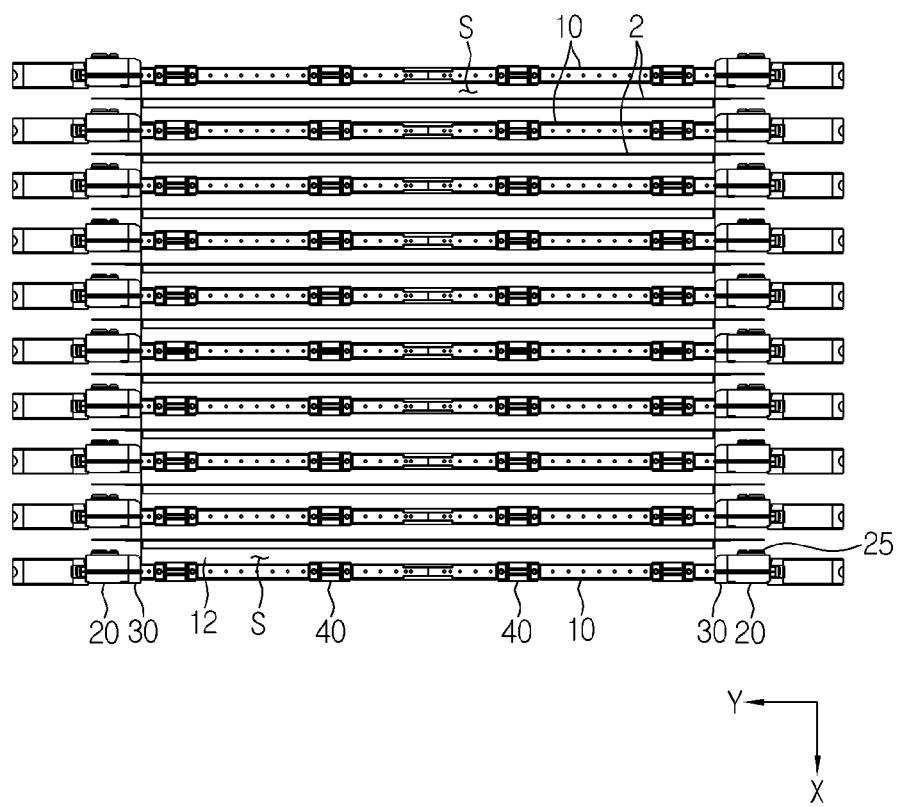
FIG. 3 is a top view of FIG. 2.

FIG. 2 is a perspective view schematically showing a charging and discharging apparatus according to an embodiment of the present disclosure, and FIG. 3 is a top view of FIG. 2.

Referring to FIGS. 2 and 3, a charging and discharging apparatus 1 according to an embodiment of the present disclosure may include a plurality of compression plates 10, gripper units 20, and push bar units 30.

In the charging and discharging process, secondary battery cells 2 may experience swelling due to expansion or gas generation of a positive electrode plate and a negative electrode plate. The compression plates 10 pressurize the secondary battery cells 2 in the charging and discharging process to prevent swelling.

The compression plates 10 are spaced apart from each other by a predetermined distance and are configured to move (in the ±X-axis direction) so that the separated space is narrowed or widened. Here, the separated space is formed such that at least one secondary battery cell 2 may be inserted therein. Hereinafter, the separated space will be defined as a cell insert space S.

As shown in FIG. 2, the secondary battery cells 2 having a gas pocket 2d in an inactive state may be transported by a pickup device and inserted and respectively disposed in the cell insert spaces S formed between the compression plates 10 one by one.

At this time, the secondary battery cell 2 is supported at a certain height using a slip sheet 12 to protect the surface of a cell body 2a when being pressed. A portion of the slip sheet 12 (see FIG. 9) may be fixed an upper portion of the compression plate 10 using a pin, and a region between the portions of the slip sheet 12 fixed by the pin may be folded and interposed in each of the cell insert space S.

The compression plates 10 press or release the body 2a of the secondary battery cells held by the slip sheet 12. The compression plates 10 may be preferably made of metal with high mechanical stiffness to avoid deformation under high heat and pressure. Here, the present disclosure should not be limited to the compression plates 10 made of metal. For example, the compression plate 10 may be made of stainless steel, tempered plastic, tempered ceramic, tempered glass, or the like.

For reference, although not shown for the sake of convenience, the compression plates 10 are connected be translatable along a shaft extending in the X-axis direction at a region therebelow, and gears are connected to one end of the shaft. A drive motor may be connected to the gears. In addition, any mechanical combination may be employed as long as the mechanical combination has a driving mechanism capable of moving the compression plates 10 to press the secondary battery cell 2.

The gripper units 20 are components that contact electrode leads 2c of the pouch-type secondary batteries to apply a current to the secondary battery cell 2 or detect a voltage. In particular, the gripper units 20 according to an embodiment of the present disclosure are provided to be respectively mounted to the compression plates 10 to move integrally with the compression plates 10.

As will be explained in detail below, the gripper units 20 are configured to move together with the compression plates 10 to reduce a gap therebetween so as to press the electrode lead 2c of the secondary battery cell 2 located therebetween.

The gripper units 20 according to this embodiment may be placed in the number of two, one on each of both edges of the top end of the compression plates 10, along with the push bar units 30. The location where the gripper units 20 are placed on the compression plate 10 may be determined according to the location of the electrode lead 2c of the secondary battery cell 2, in order to contact and compress the electrode lead 2c of the secondary battery cell 2 in the X-axis direction by the gripper units 20. Namely, as shown in FIGS. 2 and 3, the electrode leads 2c of the secondary battery cells 2 and the gripper units 20 disposed between the compression plates 10 are placed at positions corresponding to each other in the X-axis direction, so as to contact each other when the compression plates 10 press the bodies 2a of the secondary battery cells 2.

Figure 4:
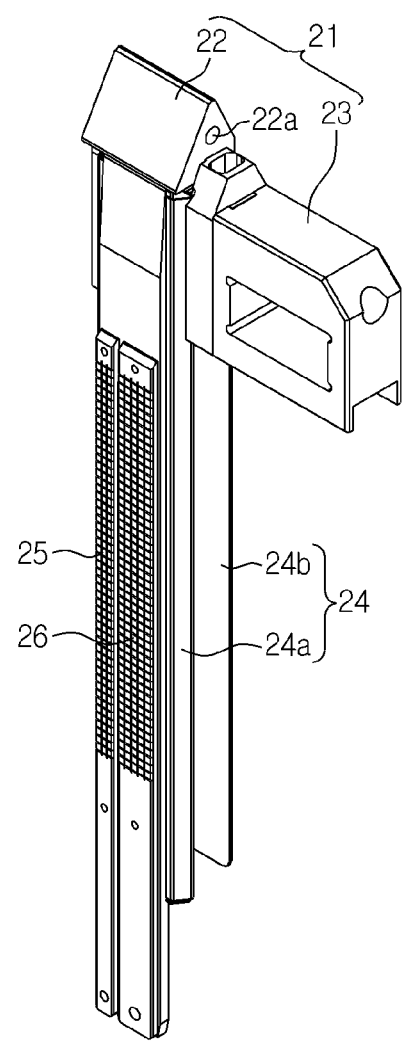
FIG. 4 is a perspective view showing a gripper unit according to an embodiment of the present disclosure.

Specifically, referring to FIG. 4, the gripper unit 20 may include a gripper head portion 21 placed on the compression plate 10 and a gripper pressing portion 24 connected to the gripper head portion 21 and extending down to the cell insert space S.

The gripper head portion 21 may include a block member 23 provided to slide along a top end line of the compression plate 10 while supporting the gripper pressing portion 24 and a cap member 22 provided on the gripper pressing portion 24 to guide the electrode lead 2c.

The block member 23 may be placed on the compression plate 10 to partially surround the top end of the compression plate 10 and slide along the top end of compression plate 10 in the left and right direction (±Y-axis direction).

For example, a gripper cradle for placing the block member 23 thereon and serving as an LM guide rail may be installed at the top end of the compression plate 10, and the block member 23 may be in the form of an LM block which is mounted to the gripper cradle to be movable in the left and right direction. Here, the top end of the compression plate 10 may also be configured to have the form of the LM guide rail, without installing a gripper cradle at the top end of the compression plate 10.

The cap member 22 may be shaped to have a surface inclined or curved toward the cell insert space S of the gripper pressing portion 24. The cap member 22 may play a role of guiding the electrode lead 2c when the secondary battery cells 2 are inserted between the compression plates 10.

For example, when the secondary battery cell 2 is vertically lowered into the cell insert space S by a cell pick-up jig, the electrode lead 2c may be guided between two neighboring cap members 22. At this time, even though there is a slight error in the loading position, the electrode lead 2c may be guided into the cell insert space S along the inclined or curved surface of the cap member 22, thereby preventing the electrode lead 2c from being damaged.

The gripper pressing portion 24 extends downward from the gripper head portion 21 and overlaps with at least one of a front surface 10a and a rear surface 10b of the compression plate. The gripper pressing portion 24 plays a role of pressing and fixing the electrode lead 2c in the charging and discharging process.

Referring to FIGS. 4 and 8 to 12 together, the gripper pressing portion 24 according to this embodiment may include a first gripper pressing portion 24a and a second gripper pressing portion 24b.

Figure 9:
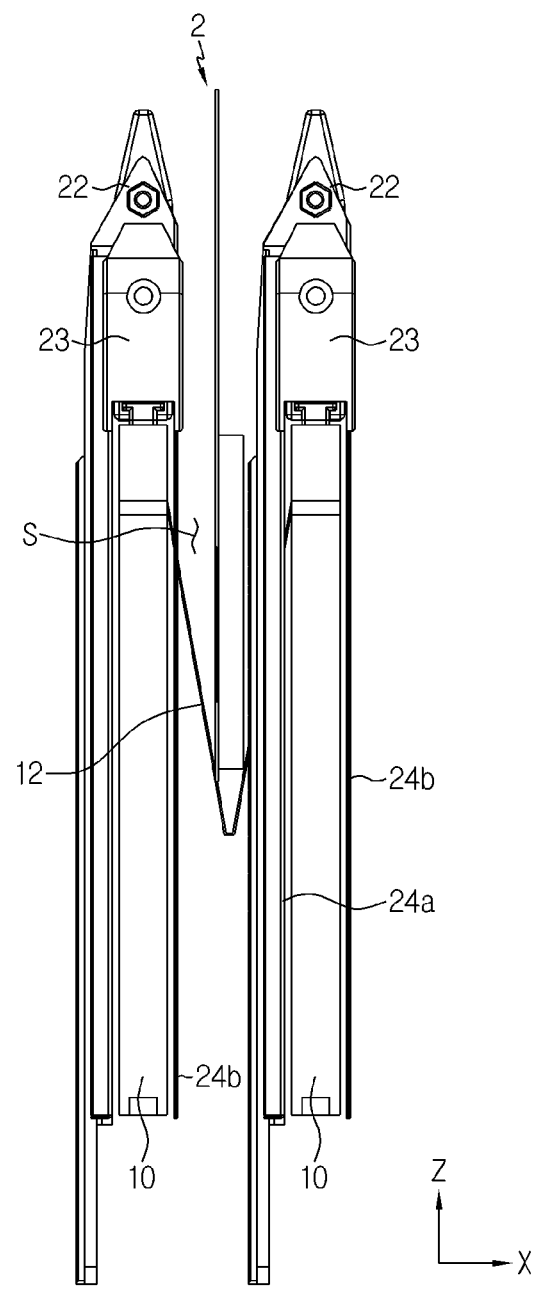
FIG. 9 is a side view showing two compression plates to which the gripper unit and the push bar unit according to an embodiment of the present disclosure are mounted.

The first gripper pressing portion 24a and the second gripper pressing portion 24b extend vertically at the front and rear surfaces of the gripper head portion 21 with a predetermined interval therebetween so that the empty space O is present therebetween. As shown in FIG. 9, the compression plate 10 may be located in the empty space O.

Since the first gripper pressing portion 24a and the second gripper pressing portion 24b of the gripper unit 20 are disposed at both sides of the compression plate 10 as described above, the gripper head portion 21 may be placed more stably without tilting to one side at the top end of the compression plate 10.

The first gripper pressing portion 24a may be disposed to be in close contact with the front surface 10a of the compression plate and implemented in an elastically deformable plate assembly form. The second gripper pressing portion 24b may be implemented in a flat plate form to be in close contact with the rear surface 10b of the compression plate.

Figure 13:
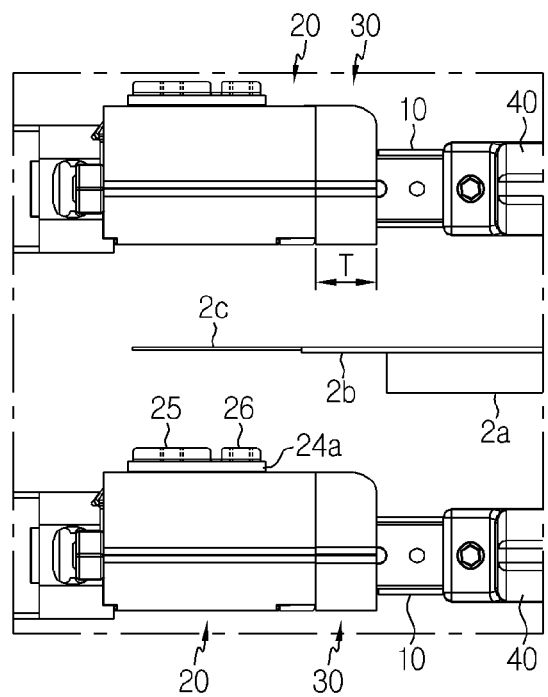
FIGS. 13 and 14 are enlarged top views showing the gripper unit and the push bar unit before and after the secondary battery cell according to an embodiment of the present disclosure is pressed.
Figure 14:
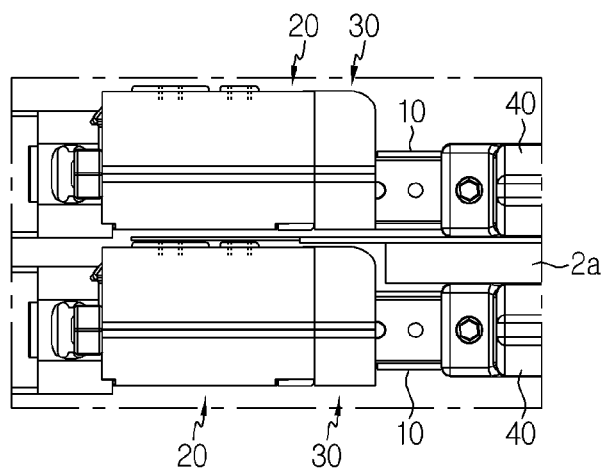

In this embodiment, referring to FIGS. 9, 13 and 14, the first gripper pressing portion 24a of any one of two gripper units 20 installed at two neighboring compression plates 10 and the second gripper pressing portion 24b of the other gripper unit 20 are positioned to face each other. Thus, if the two compression plates 10 move close to each other, the first gripper pressing portion 24a may be pushed in by the second gripper pressing portion 24b. The first gripper pressing portion 24a may be restored to its original state when the two compression plates 10 are moved away again.

A current terminal 25 for applying a current to the secondary battery cell 2 and a voltage terminal 26 for detecting a voltage may be mounted to the first gripper pressing portion 24a in order to increase the contact force with the electrode lead 2c and alleviate the impact applied to the electrode lead 2c during pressurization.

Figure 12:
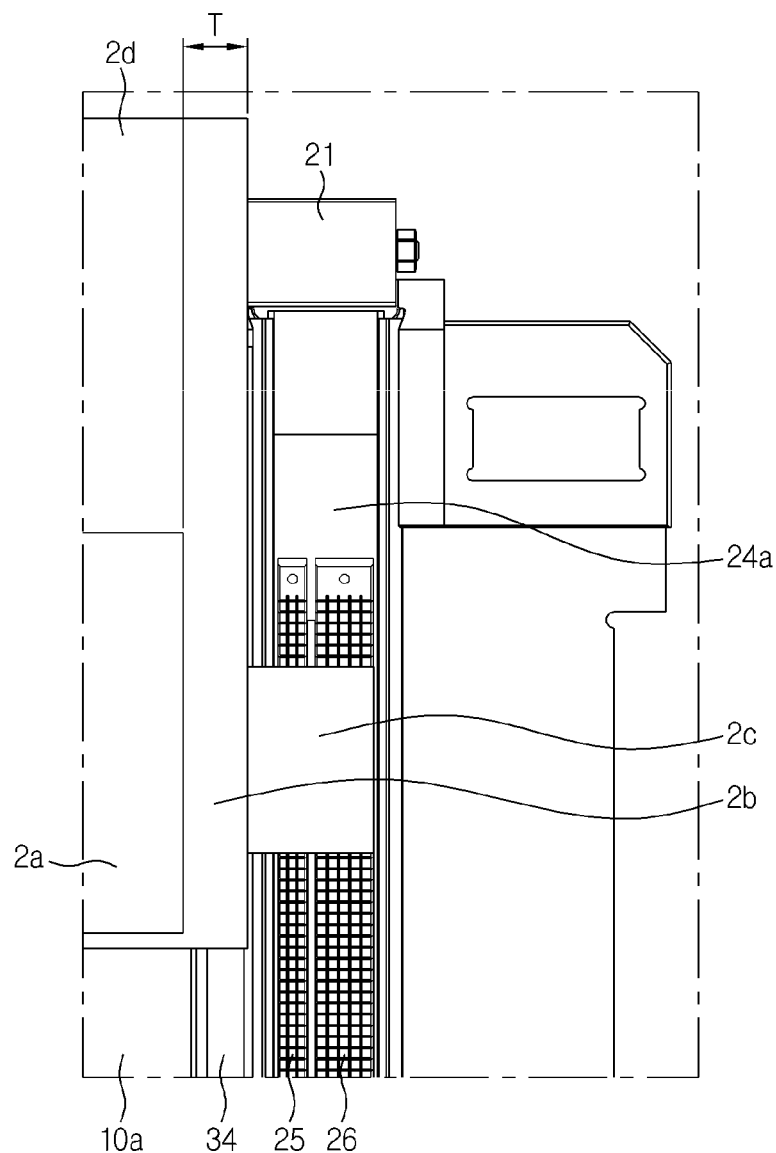
FIG. 12 is a partially enlarged view showing a main part of FIG. 11.

The current terminal 25 and the voltage terminal 26 may be implemented in the form of a metal rod, and a cable (not shown) for supplying a current may be connected to a lower portion thereof. The current terminal 25 and the voltage terminal 26 are mounted perpendicularly to the surface of the first gripper pressing portion 24a side by side as shown in FIG. 12, so as to contact the electrode lead 2c when the compression plates 10 press the secondary battery cells 2.

In addition, the current terminal 25 and the voltage terminal 26 according to this embodiment may further include a notch formed in a lattice pattern. Since the notch of a lattice pattern is formed at the contact surface of the current terminal 25 and the voltage terminal 26 as described above, the slippage of the electrode lead 2c may be prohibited to further enhance the contact force.

Meanwhile, the charging and discharging apparatus 1 according to an embodiment of the present disclosure may further include push bar units 30. The push bar units 30 press a terrace 2b of the secondary battery cells 2 in the charging and discharging process to suppress the swelling phenomenon of the corresponding portion. Here, the terrace 2b of the secondary battery cell refers to a rim portion of the heat-sealed pouch exterior at which the electrode lead 2c is pulled out. Due to the positions of the electrode lead 2c and the cell terrace 2b, the push bar units 30 may be mounted adjacent to the gripper units 20 to move integrally with the gripper units 20.

Figure 5:
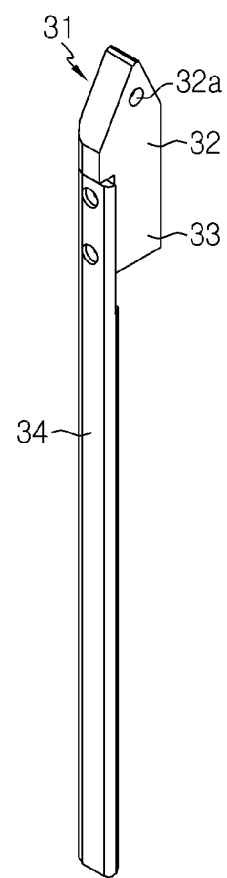
FIG. 5 is a perspective view showing a push bar unit according to an embodiment of the present disclosure.
Figure 6:
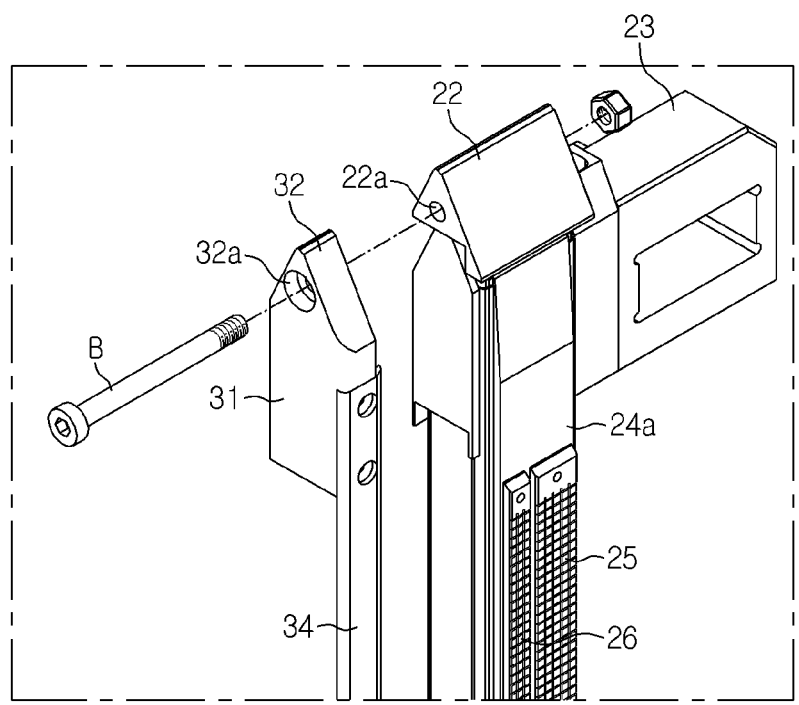
FIGS. 6 and 7 are perspective views showing states before and after the gripper unit and the push bar unit according to an embodiment of the present disclosure are assembled.
Figure 7:
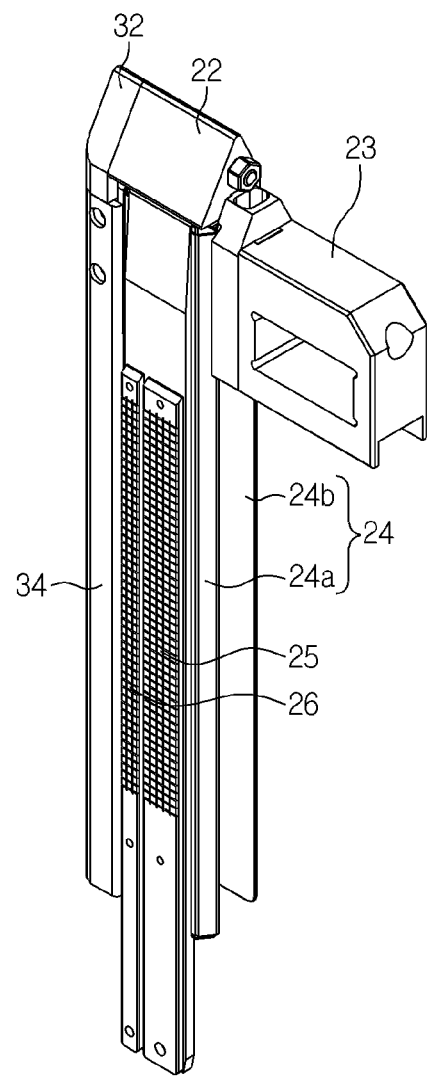
Figure 8:
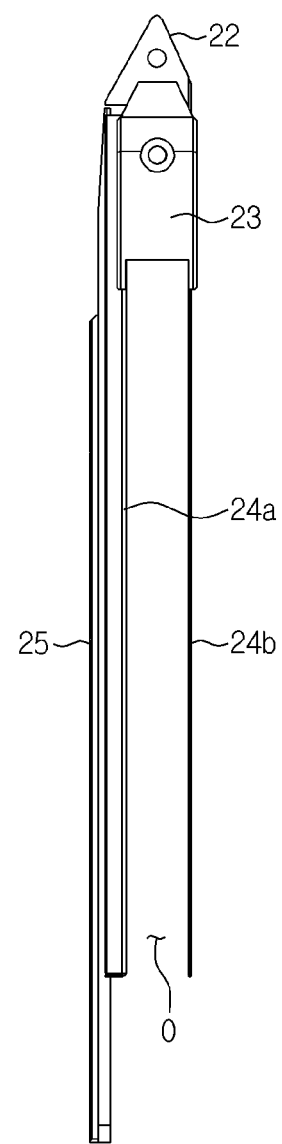
FIG. 8 is a diagram showing the gripper unit and the push bar unit of FIG. 7, observed at a different angle.

Specifically, seeing the push bar unit 30 with reference to FIGS. 5 to 7, the push bar unit 30 may include a push bar head portion 31 connected to the gripper head portion 21 and placed on the upper portion of the compression plate 10 and a push bar pressing portion 34 extending from the push bar head portion 31 to the cell insert space S.

If the push bar head portion 31 is divided into an upper part 32 and a lower part 33, the upper part 32 may be shaped to have a surface inclined or curved toward the cell insert space S, similar to the cap member 22 of the gripper head portion 21 described above.

In addition, as shown in FIG. 6, bolt penetration holes 22a, 32a through which a bolt B passes may be formed in the upper part 32 of the push bar head portion 31 and the cap member 22 of the gripper unit 20, so that the bolt B is inserted into the bolt penetration holes 22a, 32a and tightened with a nut to fix the push bar head portion 31 to the gripper head portion 21. At this time, since the upper part 32 of the push bar head portion 31 is attached in the same shape as the cap member 22, the guide region may be extended to a region adjacent to the electrode lead 2c when the secondary battery cell 2 is inserted.

The lower part 33 may have a width greater than the thickness of the compression plate 10, and the push bar pressing portion 34 may be mounted to at least one side surface of the lower part 33 along the width direction. In this case, the push bar pressing portion 34 may extend downward from at least one side surface of the lower part 33 and be disposed to overlap with at least one of the front surface 10a and the rear surface 10b of the compression plate in parallel to the gripper pressing portion 24 described above.

For example, referring to FIGS. 7 to 10 and 12, the push bar pressing portion 34 may extend downward from a left surface of the lower part 33 of the push bar head portion 31 and be disposed to overlap with the front surface 10a of the compression plate in parallel to the first gripper pressing portion 24a. This is in accordance with the formed shape of the pouch exterior applied to this embodiment.

In other words, in order to form a space for receiving the electrode assembly inside the pouch exterior, the pouch-type secondary battery cell 2 may be prepared by concavely forming one of two pouch sheets and sealing the rims of the pouch sheets or by concavely forming all of two pouch sheets and sealing the rims of the pouch sheets. Depending on the two methods, the step between the body 2a and the cell terrace 2b of the secondary battery cell 2 may be formed differently. If the pouch-type secondary battery cell 2 employing the former method is activated as in this embodiment, it may be desirable to use a push bar unit 30 having one push bar pressing portion 34. Meanwhile, if the pouch-type secondary battery cell 2 employing the latter method is activated, it may be desirable to couple two push bar pressing portions 34, one to each of both side surfaces of the push bar head portion 31, to press both side surfaces of the cell terrace 2b.

The push bar pressing portion 34 may be implemented in a rod shape having a width T and a length corresponding to the cell terrace 2b and may be made of an epoxy material considering that the bar pressing portion 34 is in direct contact with the cell terrace 2b. Here, the scope of the present disclosure should not be limited to the push bar pressing portion 34 made of epoxy. For example, the push bar pressing portion 34 may be made of any material as long as it has insulation, heat resistance, mechanical rigidity, and the like.

Hereinafter, a pressing process for pressing the electrode lead 2c and the cell terrace 2b of the secondary battery cell 2 according to an embodiment of the present disclosure will be briefly described with reference mainly to FIGS. 13 and 14.

FIGS. 13 and 14 are enlarged top views showing the gripper unit 20 and the push bar unit 30 before and after the secondary battery cell 2 according to an embodiment of the present disclosure is pressed.

First, the locations of the gripper units 20 are set on the top end line of the compression plate 10 to match with the length of the secondary battery cell 2 to which the activation process is to be performed. At this time, since the push bar unit 30 is coupled to the gripper unit 20, no additional manipulation is required. Next, a cell pick-up device is used to load the secondary battery cells 2 between the compression plates 10, respectively.

As shown in FIG. 12, the loaded secondary battery cell 2 is provided such that the electrode lead 2c is positioned at a front portion of the first gripper pressing portion 24a (in the X-axis direction) and the cell terrace portion 2b is positioned at a front portion of the push bar pressing portion 34. In this state, the drive motor is operated to press the secondary battery cell 2 by the compression plate 10.

Accordingly, when the body 2a of the secondary battery cell is compressed by the two compression plates 10, as shown in FIGS. 13 and 14, the electrode lead 2c is compressed between the two gripper pressing portions 24, the cell terrace 2b is compressed between the compression plate 10 and the push bar pressing portion 34, and the cell body 2a is compressed between the two compression plates 10.

More specifically, the electrode lead 2c may contact the current and voltage terminals 25, 26 provided to the first gripper pressing portion 24a and be pressed by the second gripper pressing portion 24b. In particular, since the first gripper pressing portion 24a is elastically pushed in by being pressed by the second gripper pressing portion 24b, a shock may be absorbed when the current and voltage terminals 25, 26 contact the electrode lead 2c. Also, the contact state may be stably maintained due to the elastic restoring force of the first gripper pressing portion 24a.

In addition, the cell terrace 2b may be compressed such that its one surface is in contact with the compression plate 10 and the other surface is in contact with the push bar pressing portion 34. That is, since the push bar pressing portion 34 protrudes in the X-axis direction further to the compression plate 10 to compensate for the step according to the thicknesses of the cell body 2a and the cell terrace 2b, the push bar pressing portion 34 may press the cell terrace 2b. Since the cell terrace 2b may be pressed as above, even if a large amount of gas is generated inside the secondary battery cell 2 in the charging and discharging process, the cell terrace 2b may be prevented from inflating. Thus, it is possible to significantly reduce the insulation voltage fault rate, which is caused as the cell terrace 2b swells to break the insulation layer in the conventional charging and discharging process.

Figure 15:
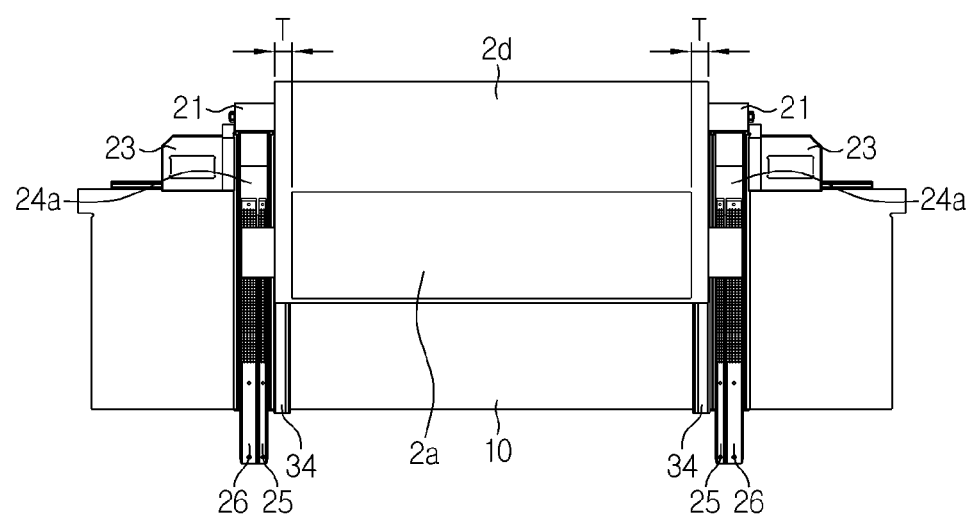
FIG. 15 is a diagram corresponding to FIG. 11 and shows a front side of the compression plate when a secondary battery cell having a different size from the secondary battery cell of FIG. 11 is mounted.

For reference, if a secondary battery cell 2 having a smaller size than the secondary battery cell 2 of FIG. 2 is inserted between the compression plates 10, as shown in FIG. 15, the gripper units 20 and the push bar units 30 may be moved from the edges of the top edge of the compression plates 10 to positions biased to the center so as to contact the electrode lead 2c and the cell terrace 2b of the secondary battery cells 2. In addition, although not shown in the figures, in the secondary battery cell 2 of this embodiment, the electrode leads 2c are bidirectional. However, even though the electrode leads 2c are unidirectional in the secondary battery cell 2, the charging and discharging apparatus 1 in which the gripper units 20 and the push bar units 30 are installed only at one edge of the compression plate 10 may be applied.

Meanwhile, the charging and discharging apparatus 1 according to an embodiment of the present disclosure may further include at least one cell entry guide 40 installed at every predetermined position on the upper portion of each compression plate 10.

The cell entry guides 40 serve to guide each secondary battery cell 2 correctly into the corresponding cell insert space S when each secondary battery cell 2 is loaded between the compression plates 10, respectively.

Figure 10:
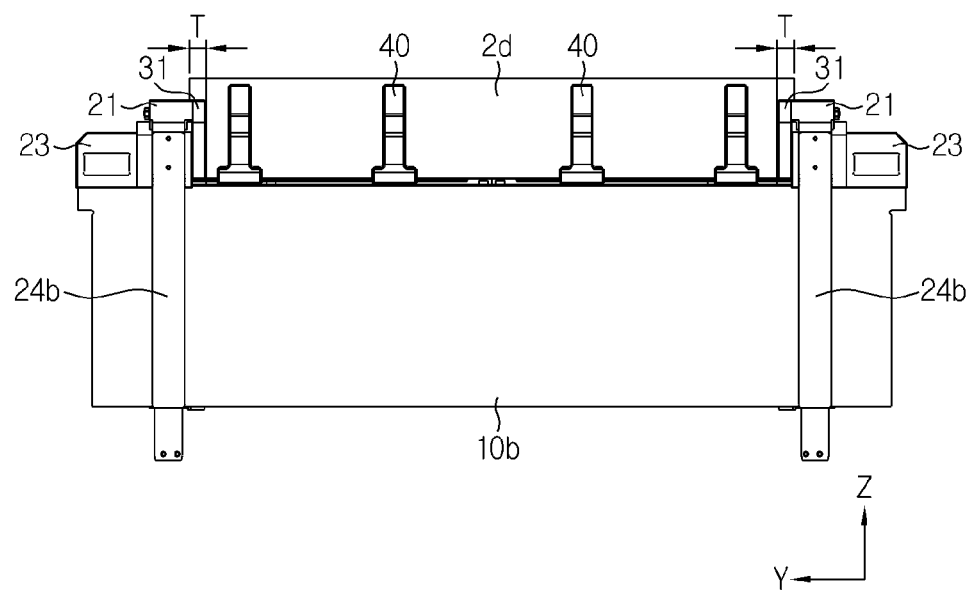
FIGS. 10 and 11 are diagrams showing a rear side and a front side of a compression plate according to this embodiment, respectively.
Figure 11:
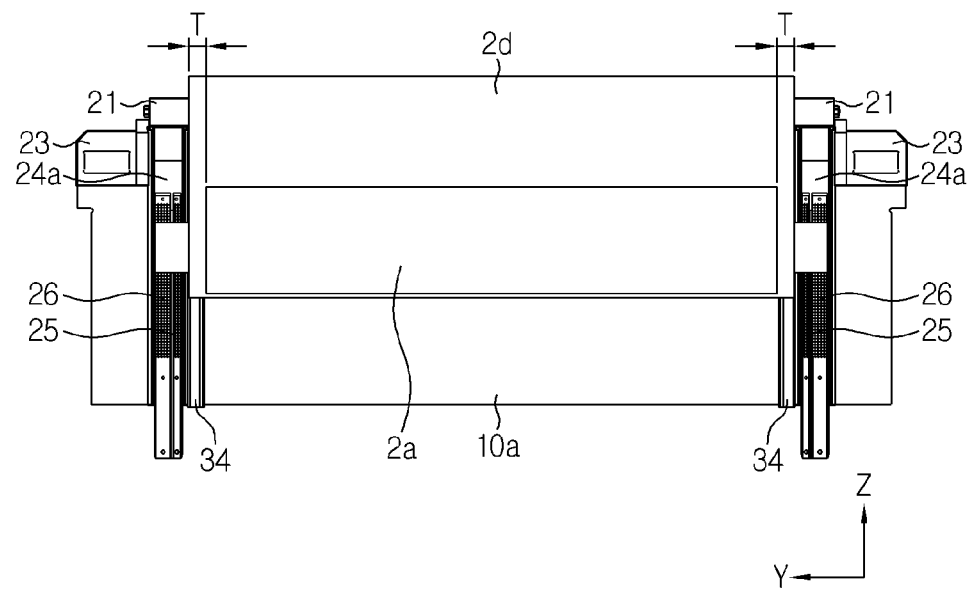

As shown in FIGS. 2, 3 and 10, the cell entry guide 40 is shaped to protrude by a predetermined height from the top end of the compression plate 10 and may have a surface inclined or curved toward the cell insert space S. In addition, the cell entry guide 40 may be installed at the top end of the compression plate 10 to be slidable in the left and right direction along the top end line of the compression plate 10.

For example, the cell entry guide 40 may be made of a nylon-based plastic material (PA66) or a fiber-reinforced plastic material (GF66) having excellent heat resistance and strength.

If the cell entry guide 40 as described above is used, even if there is a slight error when loading the secondary battery cell 2, the secondary battery cell 2 may move down along the inclined or curved surface of the cell entry guide 40, thereby compensating for the error in the cell loading position. Accordingly, the secondary battery cell 2 may be loaded more easily, and the secondary battery cell 2 may be prevented from being damaged by hitting or leaving the top end of the compression plate 10 while being loaded.

In this embodiment, four cell entry guides 40 are installed in total at the top end of the compression plate 10. Here, two cell entry guides 40 are installed at each of both sides of the top end of the compression plate 10 based on the center of the cell body 2a in consideration of the length of the loaded secondary battery cell 2, in a symmetric way. When a secondary battery cell 2 having a smaller length that that of this embodiment is loaded, the interval between the cell entry guides 40 may be reduced or the number of the cell entry guides 40 may be decreased.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, even though the terms expressing directions such as "upper", "lower", "left" and "right" are used in the specification, they are just for convenience of description and can be expressed differently depending on the position of a viewer or a subject, as apparent to those skilled in the art.

What is claimed is:

1. A secondary battery charging and discharging apparatus for performing a secondary battery activation process, comprising:
   a plurality of compression plates disposed to face each other to form a cell insert space therebetween into which a secondary battery cell is insertable, the plurality of compression plates being movable toward each other to reduce a gap therebetween to press a body of the secondary battery cell inserted into the cell insert space;

at least one gripper unit mounted to each compression plate of the plurality of compression plates to move integrally with each compression plate, the at least one gripper unit coming into contact with an electrode lead of the secondary battery cell when adjacent compression plates press the body of the secondary battery cell; and at least one push bar unit mounted to each compression plate to be adjacent to the at least one gripper unit and configured to press a terrace portion of the secondary battery cell adjacent to the electrode lead, wherein the at least one gripper unit is slidable along a top portion of the compression plate.

2. The secondary battery charging and discharging apparatus according to claim 1, wherein each push bar unit includes:

a push bar head portion connected to the gripper unit and placed on the compression plate; and a push bar pressing portion extending from the push bar head portion to the cell insert space.

3. The secondary battery charging and discharging apparatus according to claim 2, wherein the push bar pressing portion is disposed to overlap with at least one of a front surface or a rear surface of the compression plate.

4. The secondary battery charging and discharging apparatus according to claim 2, wherein the push bar pressing portion has a rod shape corresponding to a width and a length of the terrace portion of the secondary battery cell.

5. The secondary battery charging and discharging apparatus according to claim 2, wherein the push bar head portion includes an upper part having a surface inclined or curved toward the cell insert space and a lower part having a width greater than a thickness of the compression plate.

6. The secondary battery charging and discharging apparatus according to claim 5, wherein a bolt penetration hole is formed in each of the upper part of the push bar head portion and a portion of the gripper unit facing the upper part such that a bolt is insertable into the bolt penetration holes.

7. The secondary battery charging and discharging apparatus according to claim 1, wherein each gripper unit includes:

a gripper head portion placed on the compression plate; and a gripper pressing portion extending from the gripper head portion to the cell insert space.

8. The secondary battery charging and discharging apparatus according to claim 7, wherein the gripper pressing portion is disposed to overlap with at least one of a front surface or a rear surface of the compression plate.

9. The secondary battery charging and discharging apparatus according to claim 7, wherein the gripper pressing portion includes:

a first gripper pressing portion disposed to be in contact with the front surface of the compression plate, the first gripper pressing portion being an elastically deformable plate assembly; and a second gripper pressing portion disposed to be in contact with the rear surface of compression plate, the second gripper pressing plate being a flat plate.

10. The secondary battery charging and discharging apparatus according to claim 9, wherein the first gripper pressing portion includes:

a current terminal configured to contact the electrode lead to apply a current to the electrode lead, the current terminal being a metal rod; and a voltage terminal configured to detect a voltage of the secondary battery.

11. The secondary battery charging and discharging apparatus according to claim 10, wherein the current terminal and the voltage terminal each have a notch formed in a lattice pattern.

12. The secondary battery charging and discharging apparatus according to claim 7, wherein the gripper head portion includes a cap member located on the gripper pressing portion, the cap member having a surface inclined or curved toward the cell insert space.

13. The secondary battery charging and discharging apparatus according to claim 7, wherein the gripper head portion is configured to be slidable along a top end of the compression plate while supporting the gripper pressing portion.

14. The secondary battery charging and discharging apparatus according to claim 1, wherein the at least one the gripper unit includes two gripper units for each compression plate, the two gripper units being located at opposite ends of each compression plate in a longitudinal direction of each compression plate, and wherein the at least one push bar unit includes two push bar units for each compression plate, the two push bar units being located at the opposite ends of each compression plate.

15. The secondary battery charging and discharging apparatus according to claim 1, further comprising:

a plurality of cell entry guides located at a top end of each compression plate to guide the secondary battery cell into the cell insert space, wherein the plurality of cell entry guides protrude by a predetermined height from the top end of the compression plate, each cell entry guide having a surface inclined or curved toward the cell insert space.

16. The secondary battery charging and discharging apparatus according to claim 1, further comprising a slip sheet extending between adjacent compression plates of the plurality of compression plates to support the secondary battery.

* * * * *